May 23, 1967  E. H. CARRUTHERS  3,321,317

METHOD AND MACHINE FOR PACKING FOOD PRODUCTS

Filed Nov. 29, 1965  8 Sheets-Sheet 1

INVENTOR.
EBEN H. CARRUTHERS
BY
Thurson + Schoue

INVENTOR.
EBEN H. CARRUTHERS

May 23, 1967   E. H. CARRUTHERS   3,321,317
METHOD AND MACHINE FOR PACKING FOOD PRODUCTS
Filed Nov. 29, 1965   8 Sheets-Sheet 5

INVENTOR.
EBEN H. CARRUTHERS
BY

INVENTOR.
EBEN H. CARRUTHERS
BY

INVENTOR.
EBEN H. CARRUTHERS
BY
Thomas & Schow

United States Patent Office 3,321,317
Patented May 23, 1967

3,321,317
METHOD AND MACHINE FOR PACKING
FOOD PRODUCTS
Eben H. Carruthers, Warrenton, Oreg. 97146
Filed Nov. 29, 1965, Ser. No. 515,290
6 Claims. (Cl. 99—188)

This application is a continuation-in-part of my copending application, Ser. No. 293,787, filed July 9, 1963, entitled "Machine for Packing Food Products," now abandoned.

My invention relates to a method and apparatus for packing food products.

While the invention is applicable to the packing of various food products, such as various meat products, some vegetables such as string beans, the method and machine has been more particularly developed for the packing of tuna fish in so-called chunk or flake packs. Reference is made to my Patent No. 2,602,278, issued July 8, 1952, which shows a machine of the general type disclosed herein and upon which the method and machine of this application is an improvement.

In my above mentioned patent and application, I have described a machine for packing products, particularly tuna fish, in which the tuna in "flake" or "chunk" condition is fed to the machine. The tuna is fed into pockets or measuring chambers or pressure cylinders which are continuously moved through a path of travel. Force or pressure is applied on the product subsequent to a filling operation to fill voids, expel air and insure a substantially uniform homogenous fill of tuna in the pockets. After pressure has been applied, the resulting cake of tuna is trimmed off to bring the amount of tuna in the chamber to substantially the desired predetermined weight to be placed in the container to be filled. Thereafter, the compressed cake of tuna is transferred to a can or other container and then subjected to the usual later canning processes common in tuna canneries.

The machine of the above patent has been in successful operation in most of the canneries of this country and has become the standard machine for packing tuna in socalled "chunk" style. One of the difficulties encountered in the machine of the above patent is the control of weight. Overfilling the container with tuna results in a substantial loss to the canner, as tuna is a relatively expensive fish. Underfilling also presents its problems such as the cost for inspection of underfilled cans and the hand labor to bring the can up to weight by adding small pieces of tuna to the can.

It has been common practice for many years in the industry to weigh a number of cans of tuna as a unit and if the average equalled the filled-in weights, as marked on the label, the loss of tuna passed the weighing inspection. More recently the Federal Government and State legislatures have initiated legislation which would enable the Federal Government or various states to confiscate whole lots of canned food products if a can selected at random did not weigh the amount specified on the label within extremely close tolerances.

This has presented a very serious problem to the tuna industry since the texture, character and moisture content of the fish as it is canned is a variable. Moreover, it is impractical from a commercial standpoint to pack tuna fish by weight. I have found however, that with a number of modifications of a machine similar to that of the above patent, a method and machine may be provided which will maintain close weight tolerances and still permit the tuna to be packed by volume.

An object of the present invention is to provide a method and machine for packing food products, particularly tuna fish, which is more accurate in the control of the "put-in" weight of the can.

Another object of my invention is the provision of a method and machine for packing tuna in which various adjustments may be made to insure that the container will be filled with substantially the label weight of tuna nothwithstanding variations in the texture and moisture content of the tuna being packed.

A further object of the invention is to provide a method and machine whereby the head space above the tuna when in the can can be controlled.

Still another object of my invention is to control the "put-in" weight of tuna fish by subjecting the tuna when in a chamber overfilled with tuna to two compression operations to provide a compressed cake of tuna of uniform density, the successive compression steps being interposed and succeeded by trimming the tuna off the top of the compression chambers after the pressure has been removed and the tuna allowed to expand.

Other objects and advantages of the method and machine will be particularly set forth in the claims and will be apparent from the following description, when taken in connection with the accompanying drawings, in which:

FIG. 15 is a sectional view of a portion of FIG. 13 to illustrate in more detail the height adjustment of the metering roll.

Figure 3:
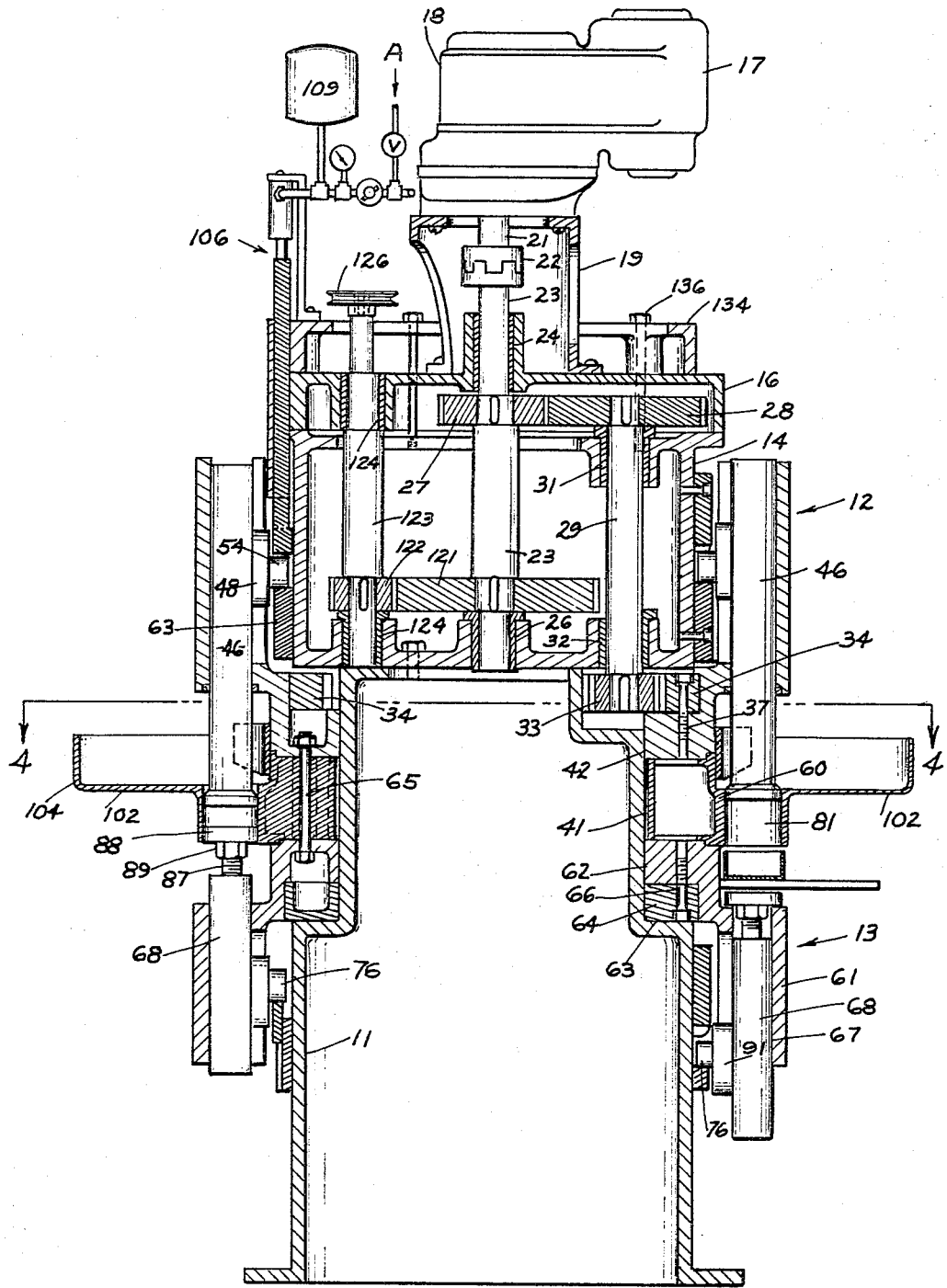
FIG. 3 is a vertical sectional view of the machine taken substantially on the line 3—3 of FIG. 2, in the direction indicated by the arrows.

Referring to FIG. 3, the mechanism of the method and machine of my invention is carried by a stationary main frame casting 11 which may be suitably secured to the floor by means not shown. Carried by the main frame is an upper rotatable turret, generally indicated by the numeral 12 and a lower rotatable turret generally indicated by the numeral 13.

Carried by the main frame at the top thereof and rigidly secured thereto, but removable therefrom, is a casting 14. The casting 14 together with a removable casting 16 constitutes a gear casing and houses and supports the drive gears for various parts of the machine as will be presently explained.

The machine is driven by a motor 17 through a suitable speed reducer 18. 17 and 18 constitute a variable speed drive for the machine to enable the machine operator by suitable controls to vary the speed of all operations at will, in a manner well-known in the art to which this invention applies, and more particularly to control the filled can output of the machine.

The variable speed drive 17–18 is mounted on the top of the casting 16 by means of an adapter 19 bolted thereto. The output shaft of the variable speed drive 17–18 is indicated by a shaft 21 driving a main shaft 23 through a flexible coupling 22.

The main shaft 23 is mounted in suitable bearings 24 and 26 carried respectively by the castings 16 and 14. A spur gear 27 is keyed to the main shaft 23 and drives a gear 28 mounted on and keyed to a lay shaft 29. The lay shaft is carried in suitable bearings 31 and 32 supported in the casting 14 and has a drive pinion 33 at its lower end keyed thereto. The drive pinion 33 mates with and drives an internal ring gear 34 (see also FIG. 4) which drives the upper and lower turrets in a manner which will be presently clear.

The upper turret 12 comprises a single casting which rotates about the frame structure above described as an axis. For the purpose of securing the casting of the upper turret 12 to the internal ring gear 34, a series of screws 37 extend annularly around and between the parts so that the upper turret 12 is a rigid rotating unit rotating with the internal ring gear 34. The main frame 11 has an accurately machined cylindrical face or barrel 41 upon which the internal machined face 42 of the upper turret 12 rides.

Figure 2:
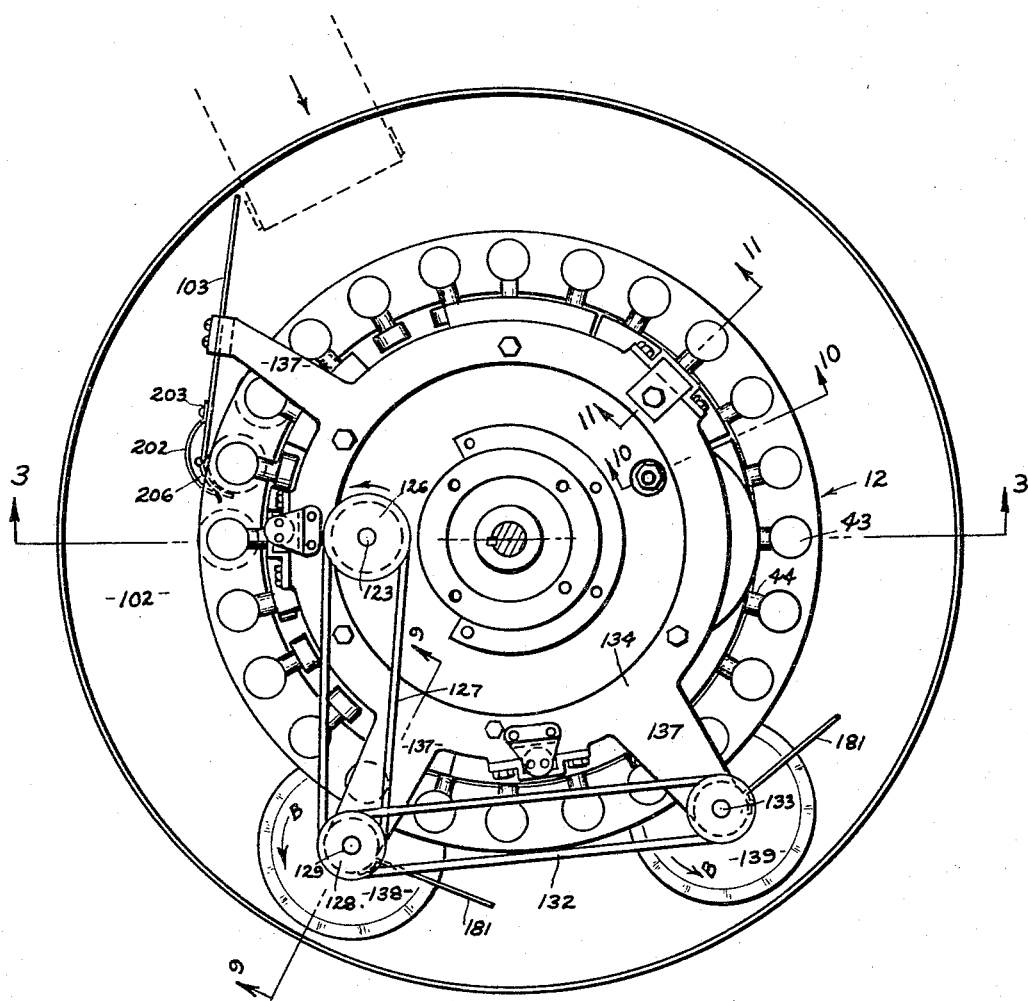
FIG. 2 is a top plan view of the machine with the motor and variable speed reducer removed for the purpose of more clearly showing the parts of the machine.

As shown most clearly in FIG. 2, the upper turret 12 has a plurality of vertically extending bores 43 each of which merges with a vertically extending guide slot or way 44. Each of the ways or guide slots 44 lies on a radius of the circle about the center of which the upper turret 12 rotates.

In the drawings I have shown twenty-four (FIG. 2) vertically extending bores 43 for the reception of a corresponding number of pistons or plungers 46 (FIG. 3). It will be appreciated that the number of plungers employed and the number of their associated parts is optional depending upon the design of the machine, the speed thereof, and the number of operations to be performed as each plunger completes a cycle.

Figure 6:
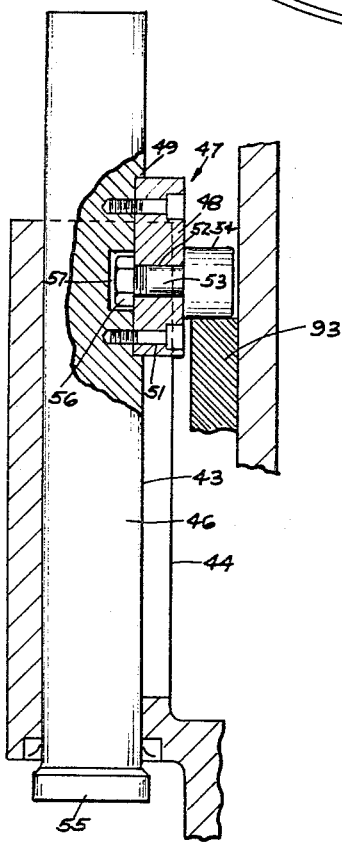
FIG. 6 is a sectional view showing the mounting for one of the upper plungers or pistons, the guide therefor and the actuating cam and roller.
Figure 7:
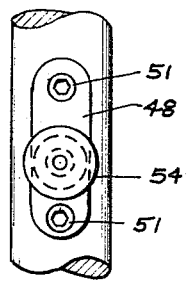
FIG. 7 is a face view of part of FIG. 6 showing the cam roller and its connections to the piston or plunger.

Referring now to FIG. 6 (and FIG. 7), that view shows a section through the upper turret and one of the pistons or plungers 46 mounted in its bore 43. I have also shown in that view the means, generally indicated at 47, for guiding and actuating the pistons or plungers 46. The vertically extending slot 44 constitutes a guide or way for the reception of a guide block 48 which is carried by the piston or plunger 46. For this purpose, the plunger may be provided with a substantially rectangular recess 49 for the reception of the correspondingly shaped guide block 48. The guide block 48 corresponds in width to the width guide slot 44 and serves to hold the plunger 46 against rotation in the bore 43. The guide block 48 has a bore 52 for the reception of a pin 53 upon which a roller 54 freely rotates. The guide pin 53 is threaded and extends through the guide block 48, the threaded end receiving a nut 56 which lies in a recess 57 formed in the plunger 46. Each of the plungers is provided with an enlarged face 55.

The lower turret 13 (FIG. 3) comprises an annular casting 61 which is driven by the upper turret. For this purpose a box-like casting 60 lies between the upper and lower turret castings and the turrets are tied together so that they rotate in unison by an annular series of through bolts 65. The casting 60 has an annular series of pockets or chambers 81 corresponding in number to the number of upper and lower plungers. The casting 61 has a machined face 62 which rides on the machined surface 41 of the barrel-shaped portion of the main frame 11. The main frame also has an annular machined ledge 63 adapted to receive and support a rotatable bearing ring 64. The bearing ring 64 is secured to the casting 61 of the lower turret 13 by means of a series of screws 66 spaced annularly around and between the parts.

Figure 1:
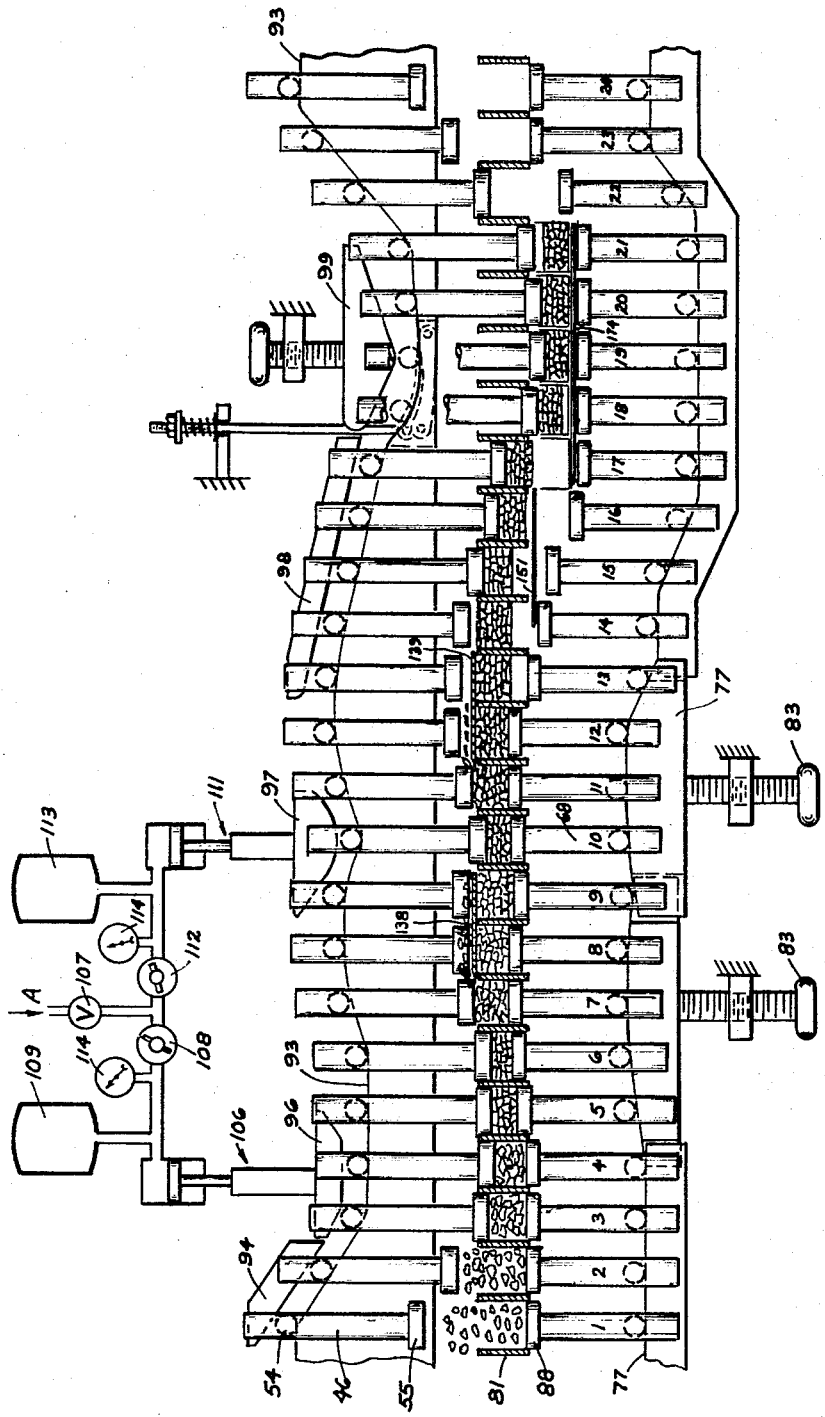
FIG. 1 is a diagrammatic view showing a developed layout of the machine and showing the complete functional operation as the tuna chunks or flakes progress through the machine and are deposited in the container and illustrating the method of my invention.

The lower turret 13 has a series of bores 67 corresponding to the number of bores in the upper turret 12. These bores are adapted to receive plungers 68. As shown most clearly in FIG. 8, the casting 13 is provided with plunger guides 69 for the reception of blocks 71 secured to the plungers by means of recessed screws 72. A stub shaft 73 having a nut 74 threaded on its end, supports a roller 76 which rides on a cam 77, or rather a series of partial cams as illustrated in FIG. 1. It will now be appreciated that as the rollers 76 ride on the partial cams 77, they move into and out of the pressure chambers 81 formed in the casting 61.

Figure 9:
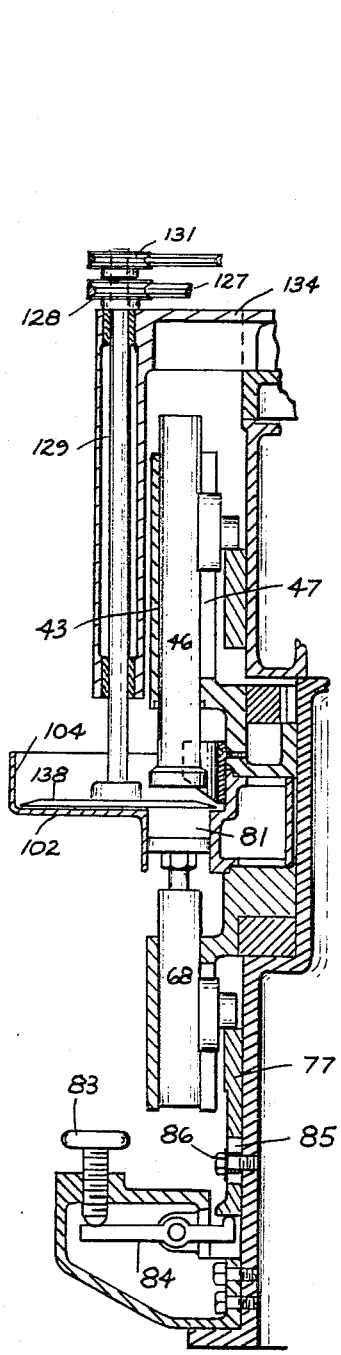
FIG. 9 is a sectional view taken substantially on the line 9—9 of FIG. 2 in the direction indicated by the arrows.

As shown most clearly in FIG. 1, the central two cams of the partial cams are adjustable in height. This height adjustment is shown most clearly in FIG. 9 at the lower part thereof and includes a rotatable handpiece 83 which actuates a pivoted lever 84. The partial cam is slotted at 85 to receive screws which allow a raising and lowering of the partial cam 77. As shown in FIG. 1, each of the two central partial cams is adjustable in height. The remainder of the partial cams are fixed.

Figure 8:
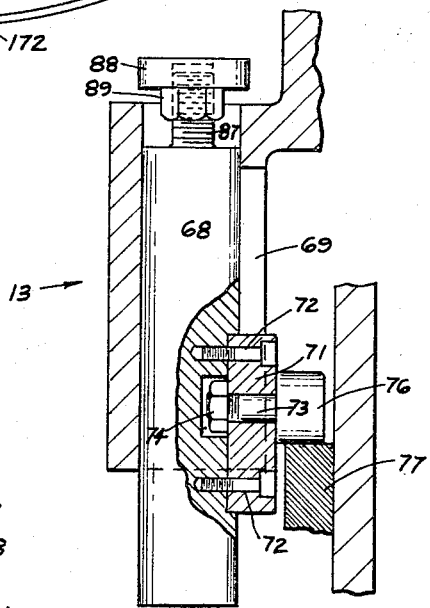
FIG. 8 is a sectional view showing one of the lower plungers together with its operating cam and roller and showing how the plunger may be adjusted to vary the volume of the compression chamber.

As shown most clearly in FIGS. 3 and 8, the lower plungers 68 have a threaded screw 87 secured thereto and an enlarged face 88. The screw extends into the face 88 (as shown in FIG. 8). The lower plunger 68 may be adjusted in height by a nut 89 to move the threaded screw 87 into or out of the plunger face. It is extremely important that the height setting of the lower plunger heads should be kept very uniform in order to maintain uniform fill from one can to the next. Any one plunger assembly can be taken for the master for which all others are set. This position is determined when the plunger selected as the master is on the dwell in the cam system, at the left of FIG. 1. Thereafter, all other lower plunger heads 87 are set to this same height.

As shown most clearly in FIG. 1 (see also FIG. 6) the upper rollers 54 ride on a lower cam 93, the shape of which will be apparent from FIG. 1. The upper cams for the rollers 54 are indicated by the numerals 94, 96, 97, 98, and 99. As will be apparent from FIG. 1, the first upper cam 94 is merely a hold-down cam, and at the first two stations 1 and 2, as viewed in FIG. 1, the upper plungers 46 are in a raised position held out of the compression chambers 81 by the contour of the lower cam. This is the tuna chamber filling position of the machine. The tuna is deposited by means of a conveyor 101 (FIG. 2), on a basin 102 part of the casting 60 which carries the filling chambers 81. The tuna is guided into the chambers by a baffle 103 the lower edge of which lies closely above the bottom of the basin. The basin has an upstanding peripheral wall 104 (FIG. 3), the basin carrying excess tuna trimmed from the compression chambers as will presently appear, around the axis of the machine to the filling position.

The second cam 96 (FIG. 1) is actuated by a piston and cylinder assembly generally indicated by the numeral 106. Air is supplied to the piston and cylinder assembly 106 from a source of supply, as indicated by the arrow A, which passes through a valve 107 and a pressure regulator 108. An air chamber 109 of relatively large volume is in the line to provide an air spring for the piston of the piston and cylinder assembly 106. The use of an air spring provides a substantially constant pressure on the piston and hence on the upper plungers 46 to insure substantially constant pressure on the tuna in the filling chambers. The air spring provides the equivalent of a conventional spring very long in length so that the relatively short movement of the plunger 46 upward to compress the air changes the pressure on the plunger a very small amount to the end that for all practical purposes constant pressure is provided. The cam 97 is actuated by a similar piston and cylinder assembly 111 from the same source of supply, as indicated by the arrow A, and passes through a regulator 112, another air pressure accumulator 113 constituting an air spring being in the line. 114 merely indicates pressure gauges.

It will be observed, upon examination of FIG. 1, that at the third and fourth stations the upper plunger heads are being forced downward by the cam 96 to compress the tuna between the upper plunger heads 55 and the lower plunger heads 88. When a predetermined compression force is reached the cam is moved upward against the force of the air spring. This relief point is determined by the original pressure charge of air admitted to the cylinder.

It will be understood that the original loose volumetric fill of tuna in each of the pockets or pressure chambers is made as uniform as possible. The means for accomplishing this is more fully described later. The weight of material in the fill of the pressure chambers must always be somewhat above the final desired weight to be placed in the cans. The original loose fill is then compacted by the first adjustable air spring, above described, to give it as nearly a uniform density as possible considering the unavoidable weight variations of the loose fill. The upper plunger then passes beyond the influence on the spring locked cam to allow the compacted mass to expand and while the lower piston moved upward as indicated at stations 5, 6, and 7. When the mass of tuna in the chambers is moved upward it lies above the mouths of the chambers as indicated in FIG. 1.

Referring now to FIG. 3, mounted on the main shaft 23 and keyed thereto is a gear 121 which drives a pinion 122 keyed to a shaft 123. The shaft 123 is mounted in suitable bearings 124 carried by the frame of the machine and drives a pulley 126 mounted at the top of the machine. The pulley 126 drives a belt 127 which drives a pulley 128 mounted on a shaft 129. Carried by the shaft 129 is a second pulley 131 (see FIG. 9), the second pulley 131 drives a belt 132 mounted on the upper end of a shaft 133. The baffle 103 and the shafts 129 and 133 are carried by an annular frame member 134 mounted on the top of casting 16 by bolt assemblies 136. The baffle 103 and the shafts 129 and 133 are carried on arms 137 which extend from the ring (FIG. 2).

Rigidly secured to the shafts 129 and 133 at the lower ends thereof are knives 138 and 139. The knives are circular, rotated horizontal to the plane of the basin and rotated directly above and in close proximity to the compression chambers 81. In fact, they form substantially a running fit with the compression chambers as the chambers pass successively under them.

It will now be observed from an examination of FIG. 1, that after the charge of tuna in the chambers has expanded, the knife 138 cuts off the top of the charge, the knives rotating in the direction of the arrows B in FIG. 2. The first cutoff occurs at stations 8 and 9 (FIG. 1). Directly thereafter, the cam 97 actuated by its air spring moves the upper pistons downward to again compress the charges of tuna in the compression chambers. The charge of tuna has now been compressed into substantially a cake at station 10 (FIG. 1). At station 11, the charge of tuna has again been allowed to expand so that it slightly overflows the compression chamber and this slight excess is cut off by the knife 139 at stations 12 and 13. It will be noted at stations 10, 11 and 12 the lower plunger 88 is moving upward.

The charge of tuna has now been compressed into a uniform mass of substantially constant weight per unit of volume. In this condition and due to the oily nature of the fish, it will support itself due to friction and cohesion of the cake with the walls of the compression chamber. This may be clearly observed at station 14. It will be noted that at station 14 (and 13), the lower plunger has been withdrawn and passes under what may be termed a shear plate 151. The purpose of the shear plate is to catch any loose pieces of tuna which may drop from the compressed cake. The shear plate extends throughout most of stations 14, 15 and 16.

Figure 4:
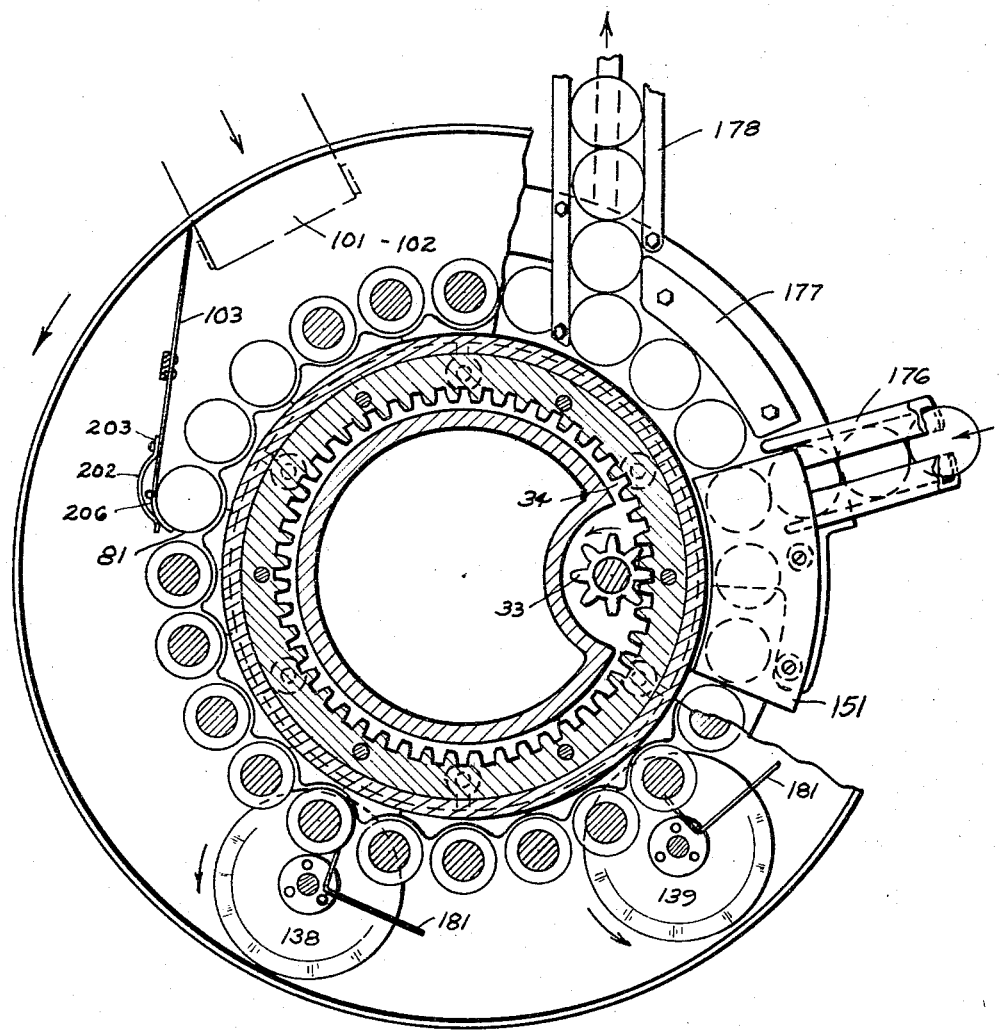
FIG. 4 is a sectional view taken substantially on the line 4—4 of FIG. 3 to clearly illustrate the pockets or chambers in the turntable into which the tuna is filled, the elements for feeding the tuna fish into the pressure chambers and the manner in which the cans or other containers are fed to and removed from the machine.
Figure 5:
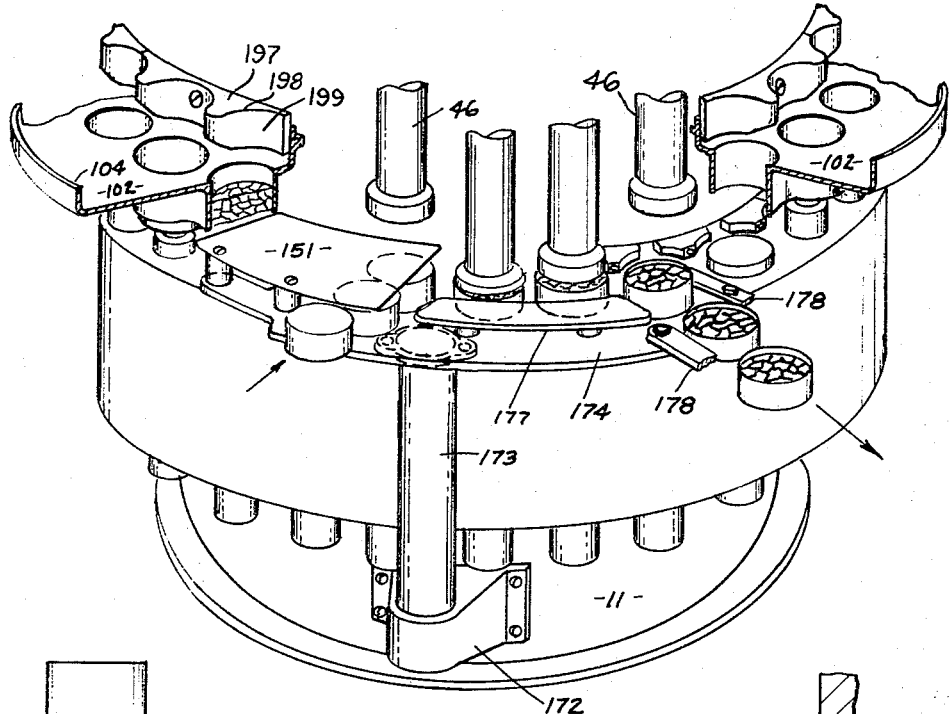
FIG. 5 is a perspective view showing the slugs or cakes of tuna being held by the walls of their respective pressure chambers, the containers entering the machine beneath a plate in alignment with the compression chambers, the cake of tuna being deposited in the container and the filled containers being removed from the machine.

Referring now to FIGS. 4 and 5, a pair of brackets 172, only one of which has been shown, are secured to the external wall of the base of the machine by means of screws. These brackets carry a pair of support columns 173. The support columns 173 have mounted on the top thereof, in any suitable manner, as by welding, a can plate 174. The cans enter the machine through a can chute 176 (FIG. 4) which is conventional in this type of machine, are guided by an annular guard plate 177 and the filled cans are discharged through a discharge chute 178. The can plate 174 is stationary and constitutes a supporting surface for the cans or other containers during the interval when the cans are being supplied empty to the machine and while they are being filled and while they are being discharged from the machine as clearly shown in FIGS. 4 and 5.

At station 17, a can is brought into registry with a compression chamber and transfer to the cans occurs at stations 18, 19, and 20. At station 21, the filled cans are leaving the machine and the upper plungers or pistons are moving upward. The lower plungers start to move upward at station 22, and at stations 23 and 24 they close the bottom of the compression chambers and the upper plungers are withdrawn from the compression pockets to re-start the cycle at stations 1 and 2.

As previously mentioned, the filling basin 102 always carries an excess of tuna to insure that the compression chambers at the filling stations 1 and 2 will be always overfilled with tuna. The tuna after being cut off is directed by guards or baffles 181, supported in any suitable manner from the frame of the machine, toward the periphery of the rotating basin. It will be appreciated that the guards or baffles 181 being located with reference to, and lying slightly above the cutoff discs, due to their direction of rotation, the cut off tuna will be directed towards the external wall or rim 104 of the rotating basin.

As shown in FIGS. 2 and 4, pivoted on the end of the baffle or filling blade 103 is a cup-shaped member 206 which is spring pressed by a spring 202 secured to the baffle as shown at 203. This cup-shaped member 206, as the upper plunger is coming down, partially encircles the plunger to assist in holding the tuna in the compression chamber as the pressure chamber is being filled.

As shown in FIGS. 3, 4, 5, and 9, secured to the upper turret are elements 197, the outer edges 198 of which are scalloped to provide partial cylindrical segments 199 which lie directly over the filling chambers to assist in confining the fish as it is directed into the filling chambers. These partial cylindrical segments cooperate with the cup-shaped member 206 during the filling operation.

It will be understood from the foregoing that after the first compression, expansion and trimming, the tuna in the pockets is substantially uniformly compressed and is approximately the desired weight. The first compression, expansion and trimming of the tuna should leave only a thin slice of tuna to be trimmed off the tops of the chambers during the second compression, expansion and trimming steps. Considering the variations in the texture and moisture content of the fish, considerable cut and try of the adjustments on the machine are necessary. However, the most important factor in securing accurate filled-in weight of the cans is to make the adjustments so that the second trim knife has only a very thin slice of tuna to cut off the tops of the compression chambers. However, at least some trim on each of the chambers should be made on the second trimming, otherwise there would be some cans underweight. I have found in practice by proper adjustments, the machine will give extremely accurate weight control and the accomplishment of this objective has been one of the major problems confronting the tuna industry.

A further problem in the tuna industry is to secure the proper amount of head space in the can to suit the desires of the particular canner and more particularly to enable adjustment of the machine to compensate for variations in the texture and moisture content of the fish. Moreover, oil is usually added to the tuna after it is packed. If the tuna is soft, less head space is desirable. The oil then soaks down through the fish and does not lie above the cake of tuna to any material extent. In general, a firm fish requires more head space because the oil has a tendency to remain on top of the cake of tuna. The head space desired is more frequently determined by the particular canner, some desiring considerable head space while others desire less.

Figures 10, 11:
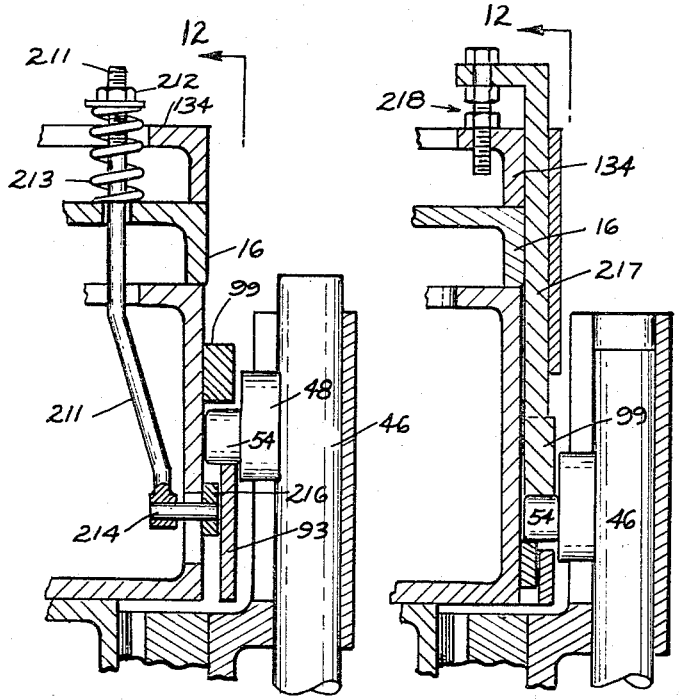
FIG. 10 is a sectional view taken substantially on the line 10—10 of FIG. 2 in the direction indicated by the arrows.
FIG. 11 is a sectional view taken substantially on the line 11—11 of FIG. 2 in the direction indicated by the arrows.
Figure 12:
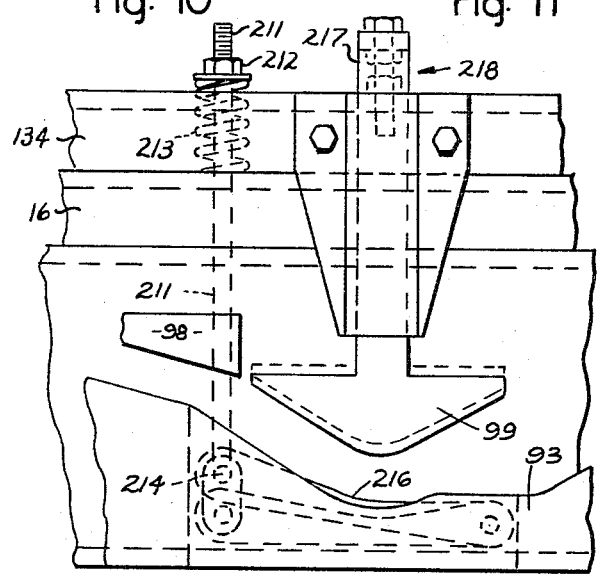
FIG. 12 is an elevational view of a portion of the machine and should be viewed in connection with FIGS. 10 and 11, illustrating the method of varying the head space over the tuna when in the container to compensate for variations in moisture content and texture of the fish being canned.

The method and means by which the head space in the can may be controlled is shown in FIGS. 10, 11, and 12, and is diagrammatically illustrated in FIG. 1 above stations 18, 19, and 20. Referring to FIGS. 10 and 12, the upper casting 134 at the top of the machine which is annular in sections, has protruding through the opening therein, the threaded end of a rod 211. The rod has threaded on it a nut 212 which backs up a spring 213. The other end of the spring butts against the margins of an opening in the casting 16. The rod 211 extends through the opening and the lower end thereof is pivotally connected to a pin 214. The pin is pivotally connected to a half-cam 216.

The roller 54 (FIG. 11) normally rides on the cam 93. Under these conditions the entire weight of the plunger assembly 46 will be exerted to force the plunger into the cans at stations 18 and 19. With soft fish, this may compress the tuna in the can to a greater extent than desired. By threading down on the nut 212 more pressure may be placed on the spring 213 to raise the rod 211 and bring the half-cam 216 upward so that it engages the roller 54 and lifts the full weight of the plunger assembly off the tuna in the can. The amount of pressure exerted by the weight of the plunger assembly may therefore be varied, by the position of adjustment of the nut 212, so that the pressure exerted is a variable less than the weight of the plunger assembly.

On the other hand, when the fish is of a relatively hard, dry texture, it may be desirable to exert a pressure on the cake of tuna in the can at stations 18 and 19 greater than the weight of the plunger assembly. This is accomplished as illustrated in FIG. 11. A member 217 extends down through the machine and engages the cam 99. The member 217 is moved downward by adjusting the nut and bolt assembly generally indicated by the numeral 218. Pressure may then be exerted on the cam 99 to force the roller 54 downward and hence the plunger 46 in a downward direction and exert a greater weight or force on the tuna at stations 18 and 19 than the weight of the plunger assembly. Thus, the adjustments shown in FIG. 11 can be used to apply a weight on the plunger so that it will exert a force greater than its weight, or by the adjustments in FIG. 10, part of the weight of the plunger may be removed so that the head space above the cake of tuna in the can is less than it would be if the entire weight of the plunger was on the cake of tuna.

Figure 13:
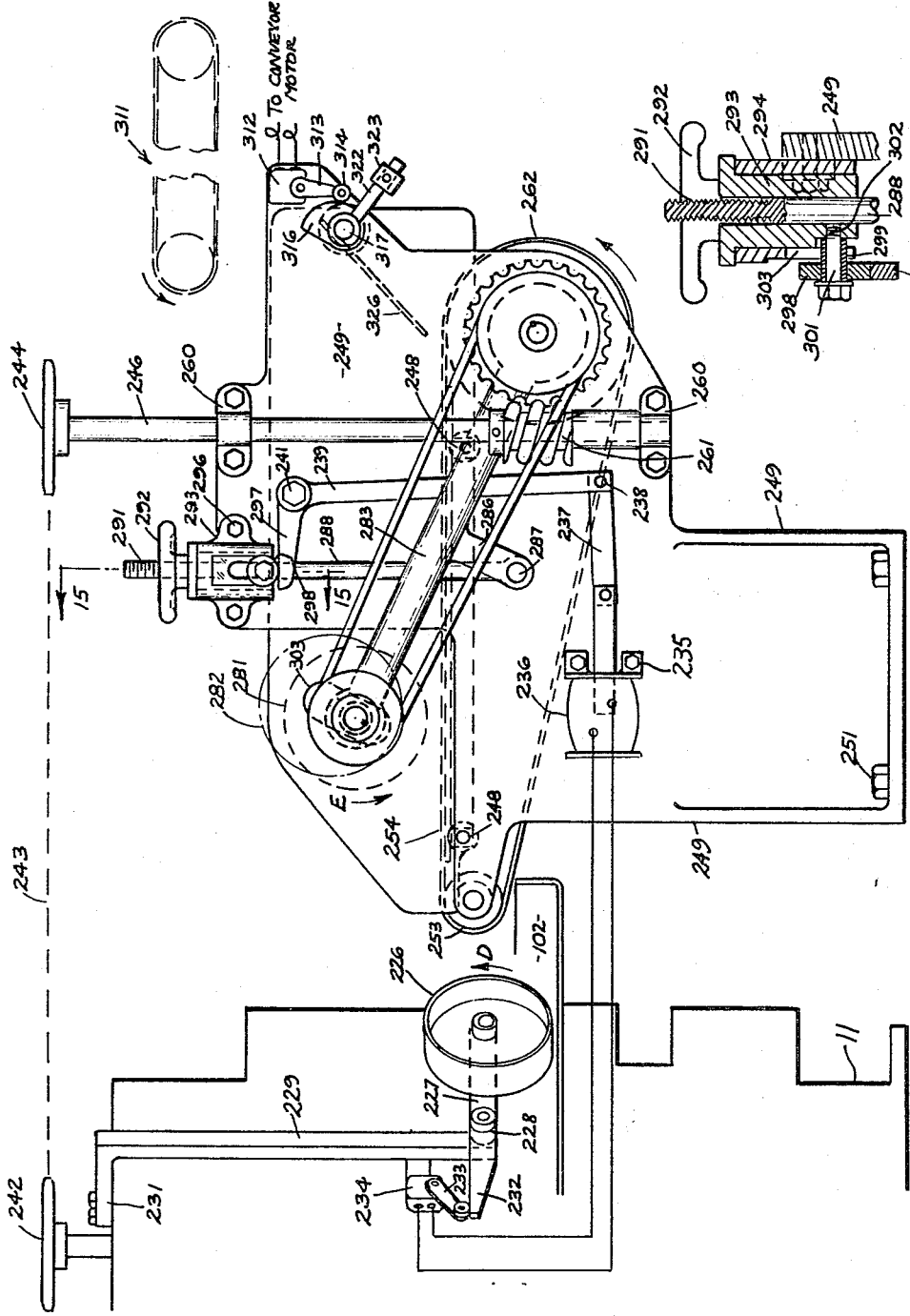
FIG. 13 is a view showing the method and machine for supplying the filling basin with a volume of tuna corresponding approximately to the filled can output of the machine.
Figure 14:
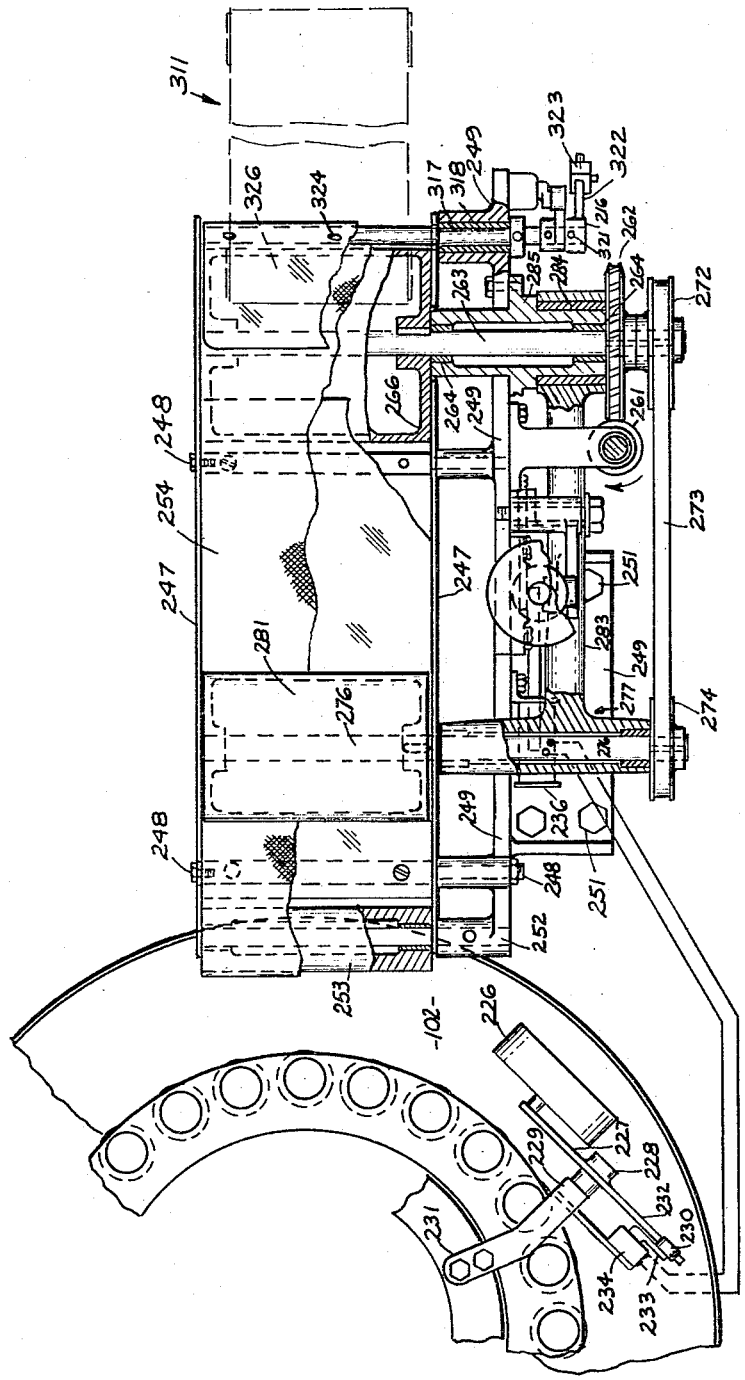
FIG. 14 is a top plan view of FIG. 13 with portions thereof broken away and in section to better illustrate the invention.

As previously mentioned, tuna is supplied to the filling basin 102 in a quantity such that a surplus of tuna is always rotating with the filling basin 102 beyond the output of tuna in the filled cans. If an ordinary conveyor such as 101 (FIG. 4) is employed, the tuna will flow to the basin in uneven amounts per unit of time, depending upon how fast the cut pieces of tuna are fed to the conveyor 101. This will cause an uneven amount of tuna to be on the filling basin at any particular time. Further, as I have previously mentioned, during the filling operation the pressure chambers should be as uniformly as possible filled with tuna. While the mechanism above described will even out an unequal filling of the chambers with tuna, and the mechanism above described can be used without metering the flow of tuna to the filling basin, it is desirable that the volume of tuna rotating on the filling basin be kept as constant as possible. The mechanism for feeding a volume of fish to the filling basin corresponding to the filled can output of the machine is shown in FIGS. 13, 14, and 15.

In general, the method involved comprises adjusting the feed of tuna to the filling basin in accordance with the level of tuna on the filling basin returning to the filling station, in general the amount of trim, which automatically adjusts the flow of tuna to the basin in accordance with the filled can output.

Tuna is unlike most commodities such as sugar, cement, and many food products, in that it varies in weight per unit of volume. This variation results from a number of factors: the species of fish being packed such as skip jack, albacore or yellow fin; whether it is frozen before precooking or is packing "fresh"; the texture and moisture content of the fish; the time duration and temperature of the precook; and other minor factors. It is therefore not possible merely to supply the basin by the conveyor 101 with a constant volume of tuna. If this is done, the packing machine will either be oversupplied with tuna or undersupplied. In the latter case, of course, at least some of the cans of tuna will be underweight. While in my method the weight of tuna filled in each can is substantially a constant, the volume of tuna with which the cans are filled is a variable. In the method of my invention, the volume of tuna supplied to the basin is a variable varying with the amount of trim from the measuring chambers returning on the basin to the measuring chambers. The volume of tuna returning on the basin must be measured upstream from the conveyor 101 as shown in FIG. 2 or in other words, beyond the second trimming knife 139 and before the conveyor 101 is reached. By this method the weight of tuna supplied to the machine, or in other words, the filled can output of the machine over a period of time is substantially a constant.

The apparatus involved in carrying out the method comprises a sensing element or roller 226 which is free to rotate on the end of an arm 227. The roller rotates in the direction indicated by the arrow D in FIG. 13 as urged by the rotation of the filling basin 102. The arm 227 is pivoted at 228 to a support member 229. The support member is carried by the frame of the machine as indicated at 231. The arm 227 has a tail piece 232 which is free to engage a roller 230 mounted on the end of an arm 233. Movement of the arm actuates a microswitch 234 carried by the support member 229.

When the sensing roller 226 rolls over a shallow level of tuna on the basin, it drops around its pivot 228 to raise the tail piece 232 and actuate the microswitch 234. The microswitch 234 initiates the operation of a solenoid 236 supported by a bracket 235 to exert an inward pull or motion to the left, as viewed in FIG. 13, on the arm or lever 237. The lever 237 is pivoted at 238 to a bell crank 239 pivoted at 241 on the frame 249 of the feed unit.

As shown in FIG. 13, a sprocket 242 is mounted on the top of the main frame of the machine and is driven from the motor-speed reducer unit 17 and 18 in any suitable manner in synchronism with the other operations of the primary machine. The sprocket drives a chain 243 which drives a sprocket 244 rigidly secured to a vertically extending shaft 246.

The metering unit includes sheet metal sides 247 for confining the flow of tuna through the feed unit. The side plates are tied together by tie bolts 248. The tie bolts are rigidly connected to the frame 249 and pass through the frame. The frame 249 comprises an irregularly shaped casting, the outlines of which can be seen in FIGS. 13 and 14 rigidly mounted on a fixed support by bolts 251. The frame carries in suitable bearings an idler shaft 252 upon which is mounted the idler roller 253 of a conveyor 254.

The vertical shaft 246 has at its lower end a worm 261, the shaft 246 being suitably mounted in bearing brackets 260 supported from the feed unit frame 249. The worm 261 (FIG. 14) drives a worm wheel 262 rigidly secured to a shaft 263. The shaft 263 is mounted in suitable bearings 264 carried by the main frame and extends across the machine, as viewed in FIG. 14, and rotates a drive pulley 266 rigidly secured to the shaft. The drive pulley supports and drives the conveyor 254.

Rigidly secured to the shaft 263 is a pulley 272 which drives a belt 273 which passes over a pulley 274 in driving relation thereto. The pulley 274 is fixed to a shaft 276 journaled in a casting 277. The shaft 276 extends through the casting and is connected in driving relation, as indicated in FIG. 14, to a metering roll 281. The direction of rotation of the pulley 274 is such as to drive the metering roll counter-clockwise as viewed in FIG. 13, or the direction of the arrow E of that view.

With the direction of rotation of the roller 281 counter-clockwise and direction of movement of the upper run of the conveyor being from right to left as viewed in FIG. 13, excess tuna flowing over the conveyor, as dictated by the level of the metering roll, tends to pile up behind the metering roll.

For the purpose of varying the flow over the conveyor 254, the level of the metering roll may be raised and lowered as indicated by the dot and dash lines 282. Thus, the shaft 276 has an amplitude of movement as the metering roll 281 is raised and lowered. The metering roll is carried by an arm 283 which is part of the casting 277 and swings around a bearing 284. The bearing 284 is pressed into a hub on the lower end of casting 277. The bearing 284 rides on the machined stub axle part of casting 285 which is bolted to the frame. An arm 286 rigidly secured to the arm 283 extends downward and has a pivot pin 287 pivotally connected to a substantially vertically extending pull-push arm 288.

Referring now to FIG. 15, the push-pull rod 288 is threaded, as shown at 291, to receive a hand wheel 292 in threaded relation. The push-pull rod 288 extends through a housing 293. The housing 293 is slidably supported in a bracket 294 rigidly secured to the frame 249 as shown at 296. The bell crank 239 has an arm 297 which engages a roller 298 rotatably mounted in bearing sleeve 299 mounted on a bolt pin 301. The end of the pin is threaded, as shown at 302, into the housing 293. A pull on 239, as viewed in FIG. 13, raises the arm 297 of the bell crank and exerts an upward pressure on the roller 298 which raises the housing together with the push-pull rod 288 as limited by a slot 303 formed in the bracket 294.

It will now be appreciated that when the level of tuna rotating with the basin 102 is low, the sensing roll feels this and drops to actuate the solenoid 236 and cause the arm 297 of the bell crank to move the roller 298 upward and push the entire housing 293 upward and carry with it the push-pull rod 288. An upward movement of the push-pull rod 288 raises the arm 283 which supports the metering roller 281. This will allow a greater supply of tuna to pass over the conveyor 254 onto the filling basin 102. As soon as the level of tuna rotating with the filling basin 102 is at a proper level, the sensing roll will feel this and inactivate the solenoid to drop the metering roll; that is, microswitch 234 is opened to de-energize the solenoid 236 and allows push-pull rod 288 to drop.

Upon rotating the handwheel 292 to thread the hand wheel on the threads 291 upward or downward, the entire range of control of the metering roll over the volume of tuna fed to the filling basin may be varied. While adjustment of the hand wheel 291 is a hand operation, it can be accomplished by the operator while the machine is in operation, and once it has been set, it seldom requires adjustment during a day's run of packing. In practice, the handwheel is adjusted by the operator so that the amount of tuna required by the primary machine is satisfied. If the adjustment the operator makes is in excess of the requirements of the machine, too much tuna will be fed to the measuring chambers and the amount of trim of the first trim knife will be excessive. To avoid this the general setting will be where the feed roll normally feeds a slight deficiency to the primary machine. Then when this deficiency is sensed by the roll 226, the solenoid will raise the housing 293 and hold it there until the deficiency is made up. After that, the roll drops to the same setting as the handwheel 292 has adjusted it.

Tuna is delivered to the automatic feed unit by a conveyor, indicated as a whole by the numeral 311. The tuna drops from the conveyor 311 onto the conveyor 254. The conveyor 311 is driven by a motor (not shown) which may be started and stopped by a microswitch 312. An arm 313 having a roller 314 at its end actuates the microswitch. The roller 314 rides on a cam 316. The cam is mounted on a shaft 317 (FIG. 14) suitably journaled, as shown at 318, in the main frame 249.

Pinned to the shaft 317, as shown at 321, is an arm 322 which has a counter-weight 323 slidable thereon. The shaft 317 extends transversely of the food control unit and has a baffle 326 pinned thereto as shown at 324. This baffle has been broken away in the plan view of FIG. 14 to show the belt and belt pulley under it.

The tuna falls from the conveyor 311 onto the conveyor 254 and feeds on the conveyor to the metering roll. The tuna passes under the metering roll on to the rotating basin of the primary machine. Under normal conditions of operation some excess tuna is held back by the metering roll. Should the discharge from the conveyor 411 exceed the amount of tuna allowed to flow under the metering roll 281, the excess will pile up behind the metering roll on the conveyor 254. When this pile up has become sufficient it will extend back to the baffle 326, lower the baffle to more nearly a vertical position and rotate shaft 317 in a counterclockwise direction as viewed in FIG. 13. The roller then lowers on the cam and the microswitch 312 will be actuated to stop the motor of the conveyor 311. When the pile-up of tuna is alleviated, the baffle 326 will rise; the cam 316 will rotate clockwise; and the microswitch actuated to restart the motor of the conveyor 311. By changing the position of the counter-weight 323 along the arm 322, the point of actuation of the microswitch 312 may be varied to result in an increase or decrease in the overall flow of tuna from the conveyor 311.

It will be understood that the tuna is diced by means not shown and is supplied to the conveyor 311 in varying amounts depending upon the speed of the dicing equipment and various other factors, particularly human limitations. Normally the conveyor 311 requires only infrequent interruptions, but if the automatic feed control unit becomes overloaded with fish, it is desirable to stop the conveyor 311. The mechanism above described provides for this and also provides a means for automatically starting the conveyor 311 again when the overloaded condition ceases, since a lowering of the baffle again actuates the microswitch to start the motor of the conveyor 311.

It is believed that the operation of the main machine as well as the feed control unit, and the interrelation of these two machines in providing a method and means for packing tuna will be apparent from the foregoing description. While I have shown the preferred form of mechanism for controlling the put-in weight of the canned tuna, it will be understood that various changes may be made in both the main machine and the feed control unit without departing from the spirit of the invention as set forth in the appended claims.

I claim:
1. A method of packing fish in containers which comprises the steps of:
    (a) flowing a volume of fish to a rotatable basin having filling chambers, said basin always carrying an excess of fish to insure that the chambers will be filled with more fish than is to be packed in each of the containers;
    (b) guiding the pieces of fish into said chambers;
    (c) precompressing the fish in each of said chambers and then moving the fish upward so that some excess fish lies above the tops of said chambers;
    (d) trimming off said excess;
    (e) compressing the fish in each of the chambers again and moving the fish upward so that at least some excess fish lies above the tops of each of said chambers;
    (f) trimming off said excess to obtain a substantially constant volume of fish in each of said chambers of substantially constant density; and
    (g) transferring the fish in each of the chambers to each of a series of containers presented at a filling station.

2. A machine for packing a food product in containers wherein a basin having measuring chambers is driven, comprising in combination:
    (a) means for urging the product into the chambers in a quantity in excess of that to be placed in the containers;
    (b) means for precompressing the product in the chambers and thereafter allowing it to expand to overflow the chambers;
    (c) means for cutting off the overflow to a volume approximating that to be placed in the containers;
    (d) means for again compressing the product in the chambers and allowing it to expand to slightly overflow the chambers;
    (e) means for cutting off said second overflow to bring the product into successive cakes of product of substantially uniform volume and weight; and
    (f) means for transferring the product from the chambers successively into a series of containers presented at a container filling station.

3. A machine in accordance with claim 2 in which means are provided in connection with said transferring means for varying the head space above the cakes of product when in the containers.

4. A machine in accordance with claim 2 in which means are provided for varying the volume of said chambers and said precompressing and compressing pressures.

5. A machine for packing a food product in containers wherein the product is compressed in a chamber by a plunger, means in combination with said plunger for controlling head space above the product when in the container comprising a cam which loads the plunger with a force above the weight of the plunger and means for rendering said cam ineffective and offsetting the weight of the plunger a variable amount so that the pressure on the product is less than the weight of the plunger.

6. A machine for packing a food product in containers comprising in combination:
    (a) a basin rotatable about a vertical axis and having a plurality of compression chambers spaced inwardly from the periphery thereof;
    (b) means for supplying product to the basin, some of said product rotating around said axis and with the basin;
    (c) means adjacent a chamber filling station for directing the product from the basin into the chambers;
    (d) plungers for compressing the product in the chambers; and
    (e) a spring pressed member conforming to the shape of the plungers for holding the product in alignment with the chamber as a plunger moves toward a chamber.

References Cited by the Examiner
UNITED STATES PATENTS
2,602,578  7/1952  Carruthers _____ 99—188
2,630,390  3/1953  Carruthers _____ 99—188 X A. LOUIS MONACELL, *Primary Examiner.*

L. M. SHAPIRO, *Assistant Examiner.*